UNITED STATES PATENT OFFICE.

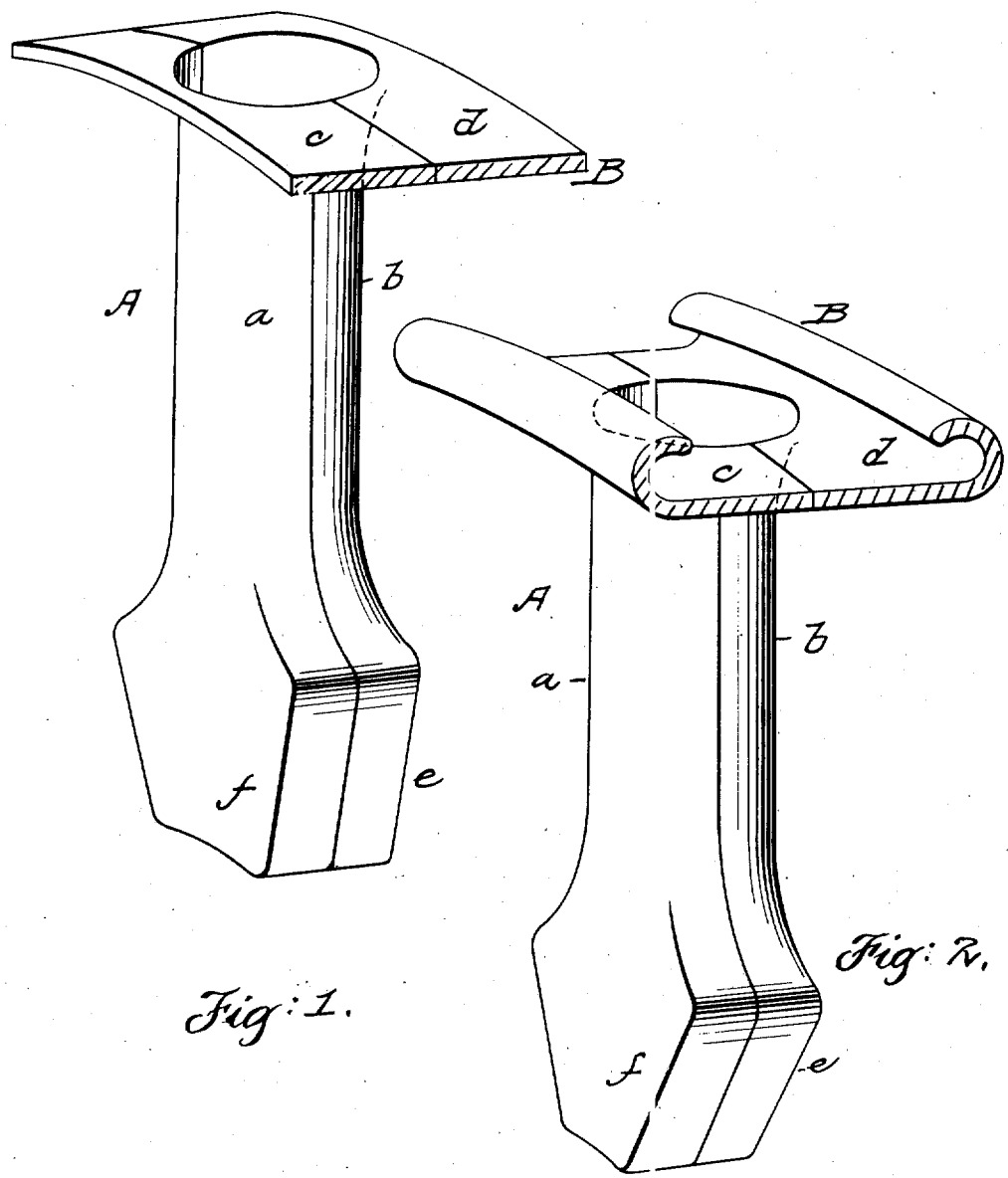

THOMAS E. MURRAY, OF NEW YORK, N. Y.

METAL VEHICLE-WHEEL.

1,223,088.     Specification of Letters Patent.     Patented Apr. 17, 1917.

Application filed June 28, 1916. Serial No. 106,315.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention relates to vehicle wheels of sheet metal, and consists in the construction hereinafter set forth, whereby the rim is formed in two similar circumferential homogeneously united sections, and each spoke in two similar longitudinal homogeneously united sections, the said spoke sections being electrically butt welded to said rim sections.

The object of the invention is to simplify and cheapen the construction of sheet metal vehicle wheels of the type here shown.

In the accompanying drawings—

Figure 1 shows my invention applied to a spoke and rim in band form, and Fig. 2 the same applied to a rim having the usual turned over edges for engaging a tire.

Similar letters of reference indicate like parts.

The spoke A is formed of two longitudinal half sections $a$, $b$, electrically welded at their longitudinal edges, said sections being made by striking up, stamping or pressing the metal. At its outer end, each spoke section is electrically butt welded to one of the two sections $c$, $d$, which together form the rim B, and which are themselves electrically united at their circumferential edges. The rim may have the usual shape, shown in Fig. 2, to adapt it to hold a tire, or it may be flat, as shown in Fig. 1. In either case the inner periphery of the rim is smooth.

The inner end of each half spoke section $a$ or $b$ may be a wedge-shaped frustum, as shown at $e$, $f$, with the edges of the spoke sections lying in a plane parallel to the flat front and rear faces of the wedge-shaped ends of said spokes.

I claim:

A vehicle wheel of sheet metal, comprising tubular spokes, each spoke being formed in two longitudinally divided half sections, and the rim being formed in two circumferential half sections, each rim section having a uniformly smooth inner periphery with recesses in the opposing edges of said rim sections, the said spoke sections being electrically butt welded to said rim sections and registering with said recesses, and the said rim sections and the sections of each spoke being electrically welded together at their meeting edges.

In testimony whereof I have affixed my signature in presence of two witnesses.

THOMAS E. MURRAY.

Witnesses:
   GERTRUDE T. PORTER,
   MAY T. McGARRY.